United States Patent
Gordon et al.

(10) Patent No.: US 7,024,678 B2
(45) Date of Patent: Apr. 4, 2006

(54) METHOD AND APPARATUS FOR PRODUCING DEMAND REAL-TIME TELEVISION

(75) Inventors: Donald F. Gordon, Los Altos, CA (US); Christopher Goode, Menlo Park, CA (US); Ted Ludvig, Redwood City, CA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 154 days.

(21) Appl. No.: 09/201,530

(22) Filed: Nov. 30, 1998

(65) Prior Publication Data

US 2003/0163824 A1   Aug. 28, 2003

(51) Int. Cl.
    *H04N 7/173* (2006.01)
(52) U.S. Cl. .............................. 725/88; 725/91; 386/68
(58) Field of Classification Search .................. 725/87, 725/88, 91, 92, 93, 94, 103; 386/68, 83, 386/82, 70, 125; 709/219, 231, 233
    See application file for complete search history.

(56) References Cited

U.S. PATENT DOCUMENTS

| | | | | |
|---|---|---|---|---|
| 5,606,359 A | * | 2/1997 | Youden et al. ................ | 725/88 |
| 5,657,072 A | * | 8/1997 | Aristides et al. .............. | 725/46 |
| 5,701,383 A | * | 12/1997 | Russo et al. .................. | 386/46 |
| 5,771,335 A | * | 6/1998 | Lee ............................. | 386/111 |
| 5,815,146 A | | 9/1998 | Youden et al. | |
| 5,818,537 A | * | 10/1998 | Enokida et al. ............. | 348/441 |
| 5,892,910 A | * | 4/1999 | Safadi ........................ | 709/217 |
| 5,970,233 A | * | 10/1999 | Liu et al. .................... | 709/246 |
| 6,084,636 A | * | 7/2000 | Sugahara et al. ...... | 375/240.03 |
| 6,130,898 A | * | 10/2000 | Kostreski et al. ........... | 370/522 |
| 6,272,278 B1 | * | 8/2001 | Takahata et al. ............. | 386/46 |
| 6,314,576 B1 | * | 11/2001 | Asamizuya et al. .......... | 725/91 |

FOREIGN PATENT DOCUMENTS

| | | |
|---|---|---|
| EP | 0 746 158 A2 | 12/1996 |
| WO | WO/13121 * | 5/1996 |
| WO | 96/17306 | 6/1996 |

* cited by examiner

*Primary Examiner*—Christopher Grant
*Assistant Examiner*—Andrew Y. Koenig
(74) *Attorney, Agent, or Firm*—Patterson & Sheridan, LLP

(57) ABSTRACT

A demand television system comprising a broadcast encoder and a storage encoder. The broadcast encoder encodes a real-time video frame sequence to form a broadcast bitstream and broadcasts the broadcast bitstream to a plurality of subscriber equipment, while simultaneously the storage encoder encodes the real-time video frame sequence to form a storage bitstream that is stored in an information server. The subscriber equipment decodes the broadcast bitstream to display the broadcast program. At any time, the subscriber equipment may request to review the information previously displayed in the broadcast bitstream. As such, the storage bitstream is transmitted to the subscriber equipment. The storage bitstream facilitates standard play of the previously broadcast information as well as trick play such as fast forward and fast reverse functions.

21 Claims, 5 Drawing Sheets

METHOD AND APPARATUS FOR PRODUCING DEMAND REAL-TIME TELEVISION

CROSS-REFERENCE TO A RELATED APPLICATION

The disclosure contained in this application is related to U.S. patent application Ser. No. 09/201,529, filed simultaneously herewith and herein incorporated by reference.

BACKGROUND OF THE DISCLOSURE

1. Field of the Invention

The invention relates to video-on-demand systems and, more particularly, the invention relates to a method and apparatus for generating a real-time video bitstream for transmission through a video-on-demand system as well as simultaneously storing the video information in a format that facilitates demand television, i.e., a play bitstream, a fast forward bitstream and a fast reverse bitstream that are derived from the real-time video bitstream content.

2. Description of the Background Art

In a video-on-demand system such as the OnSet™ system manufactured by DIVA Systems Corporation, a file server is used for streaming video information to users (subscribers) of the system. The OnSet™ system is described in U.S. Pat. No. 6,253,375, and the file server is described in U.S. Pat. Nos. 5,671,377 and 5,581,778. The disclosures of this application and these patents are incorporated herein by reference. The OnSet™ system contains service provider equipment coupled through an information distribution network to subscriber equipment. This system provides subscribers VCR-like controls to enable a subscriber to select information content, for example, a movie, then play, fast forward, rewind, pause, or stop the selected movie. The subscriber enters control commands through the subscriber equipment and the service provider equipment executes the commands to fulfill the purpose of the command, e.g., play, fast forward, rewind, stop or pause the movie.

A file server forms a portion of the service provider equipment and stores, for a given movie, a standard play stream (i.e., an MPEG-2 compressed video bitstream), a fast forward stream and a fast reverse play (rewind) stream. The fast forward and fast reverse streams are also MPEG-2 compressed video, where the fast forward stream is a compressed signal containing only every Nth frame of the uncompressed play video and the fast reverse stream is a compressed signal containing every Nth frame of the uncompressed play video played backwards. To store the video information, each stream is divided into portions (e.g., N-byte segments of compressed data) and striped onto a disk array. The disk array stores all the information that the file server can directly access.

The process for generating the fast forward and fast reverse streams is performed in a non-real time manner such that the video content is pre-encoded and stored in the file server. The process requires a frame by frame analysis of the video stream to enable the frames to be encoded in an MPEG-2 compliant form, yet provide a fast forward and fast reverse effect when decoded. As such, the video sequence is processed to extract every Rth frame (i.e., one of every R frames, where R is an integer greater than 1) to form a fast forward sequence and then the fast forward sequence is encoded (compressed). For a fast reverse stream, a sequence of frames in reverse order is created and encoded. This encoding process can not be used for producing fast forward and fast reverse streams in real time such that a real time program can be encoded and stored for almost immediate use of VCR-like functions.

Therefore, there is a need in the art for an improved encoding system for a video-on-demand system to ensure near real-time availability of fast forward and fast reverse functions and real-time availability of a high bit rate video bitstream that, when decoded, produces a play sequence.

SUMMARY OF THE INVENTION

The disadvantages associated with the prior art are overcome by the invention of a demand television system that simultaneously encodes a broadcast video frame sequence into a broadcast bitstream and a storage bitstream. The broadcast bitstream is broadcast to system subscribers as the sequence is encoded, while the storage bitstream is stored in an information server. The subscriber may, at any time during the broadcast, elect to review content of the broadcast that was previously displayed. Upon electing to review, the system transmits the storage bitstream to the subscriber in a pointcast manner. The storage bitstream contains, for example, a plurality of selectable types of bitstreams including fast forward, fast reverse and standard play. As such, by requesting particular functions, the subscriber is provided with VCR-like functions for a broadcast program.

To facilitate this functionality, a video encoder that simultaneously produces an MPEG-2 compliant fast forward, fast reverse and play bitstreams from a sequence of video frames, e.g., 601-format video, as well as a real-time bitstream for real-time transmission to the user as a broadcast transmission. The encoder of the present invention contains a broadcast encoder and a storage encoder. The broadcast encoder encodes the video frame sequence using, for example, a high bit rate encoder to ensure accurate encoding and transmission of sporting events. While simultaneously the storage encoder subsamples the video sequence, extracts a plurality of frames from the video sequence and buffers the subsampled frames. Simultaneous with the subsampling and buffering, the storage encoder also encodes the source frames within a real-time encoder, e.g., an MPEG-2 encoder, to form a standard play bitstream for storage within the file server.

As the play bitstream is being encoded, the buffered frames are recalled from the buffer and coupled to a second real-time encoder. The second encoder forms both the fast forward and fast reverse bitstreams using a time multiplexing technique wherein a group of pictures (GOP) for the fast forward stream can be formed, followed by the compression of the same GOP having the frames organized in reverse order. As such, the compressed GOPs are represented by the fast forward and fast reverse bitstreams. The play, fast forward, and fast reverse bitstreams for each GOP are organized into a file and stored on the mass storage device (e.g., disk drive array) of the file server.

While the bitstreams that facilitate the VCR-like functions are being encoded and stored, the high bit rate encoded signal is broadcast to subscribers. As such, the subscriber may watch an event (e.g., a sporting event) in real-time, then elect to "rewatch" a previously viewed portion of the real-time event. The viewer merely depresses a "rewind" or reverse button on a remote control and the VOD system accesses the stored event files and "plays" the fast reverse bitstream. As such, the viewer is provided with the sense of a VCR rewind function. At an appropriate location the viewer depresses a "play" button and the stored standard play bitstream is transmitted to the viewer. The viewer may "catch up" to the real-time event by either depressing a fast forward button or a "real-time" button. The fast forward button causes the stored fast forward bitstream to be transmitted to the viewer to provide a sense of a VCR fast forward mode and, when the fast forward bitstream exhausts the available data, the system automatically switches back to the real-time bitstream. The "real-time" button causes the system to instantly switch back to the real-time bitstream.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
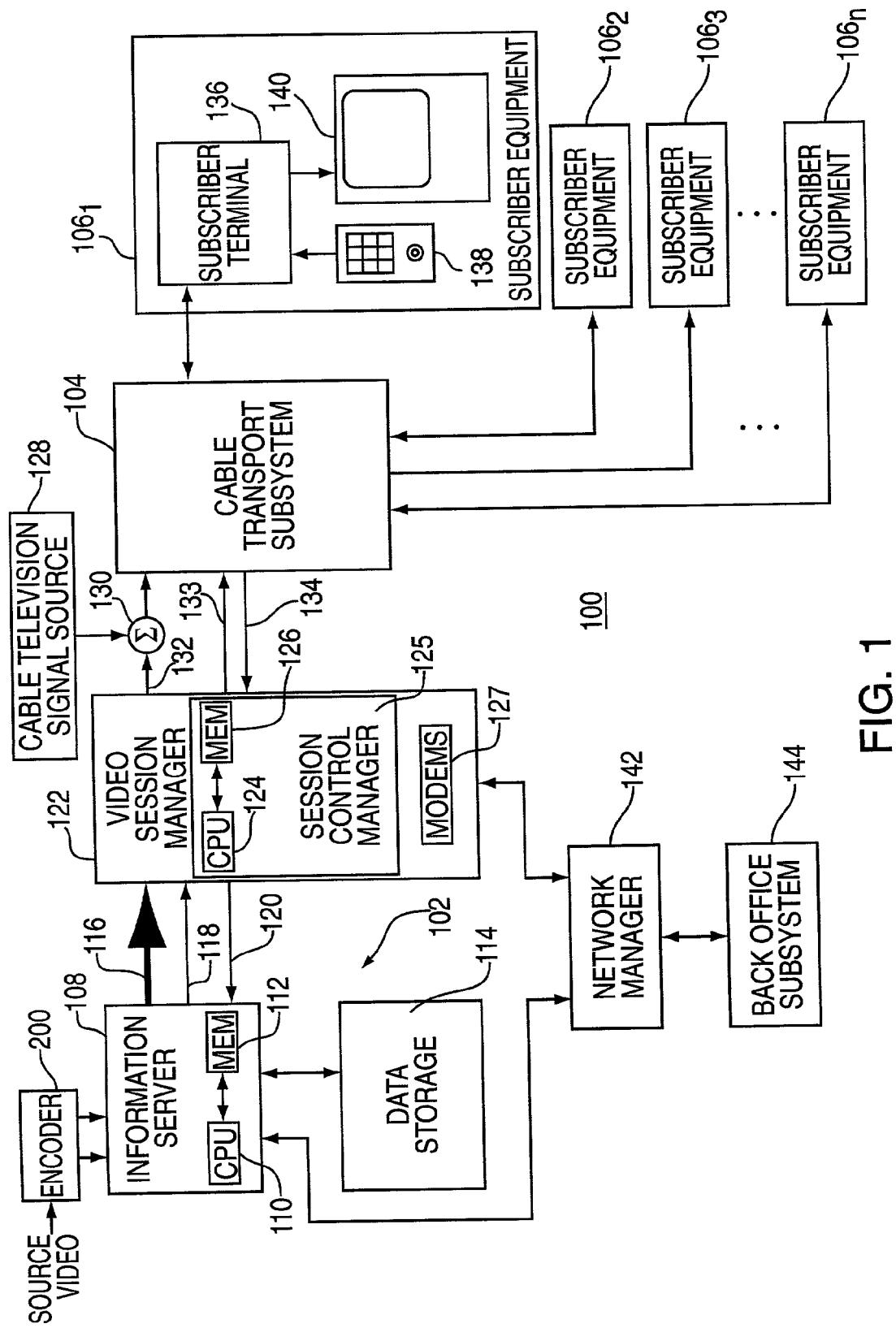
FIG. 1 is a block diagram of a video-on-demand system that operates in accordance with the present invention.

FIG. 1 depicts a high level block diagram of the illustrative information distribution system 100 that incorporates the present invention. The system 100 contains service provider equipment 102, a communications network in the form of a cable transport subsystem 104 and subscriber equipment $106_n$, where n is an integer greater than 0. The service provider equipment 102 contains an information server 108 which is typically a parallel processing computer containing at least one central processing unit 110 and associated memory 112. U.S. Pat. No. 5,671,377, issued Sep. 23, 1993 and U.S. Pat. No. 5,579,527, issued Nov. 26, 1996, which are hereby incorporated herein by reference, describe a server that is capable of operating in the capacity of information server 108. The server 108 interacts with the data storage device 114 (e.g., a disk drive array) that generally stores the subscriber information (e.g., video data) that is transmitted directly to the subscriber equipment 106 as well as recalled and downloaded to the subscriber equipment 106. The video data is produced by an encoder 200 as two streams: the first is a stream containing a real-time bitstream of encoded video information that is to be broadcast to the subscribers (referred to herein as the broadcast stream), the second is a stream containing a non-real-time bitstream of encoded video information that is stored by the information server to facilitate VCR-like functions (referred to herein as the storage stream).

Additionally, within the service provider equipment 102 is a video session manager 122 that provides session control of the information flowing to and from the server 108. The video session manager 122 contains its own central processing unit (CPU) 124 and associated memory 126 that provides functionality for the graphical user interfaces through which the consumer interacts with the system. The CPU 124 is part of a session control manager 125 that controls a plurality of modems 127 that facilitate communication with the subscriber equipment. Other subsystems of the service provider equipment include a network manager 142 and a back office subsystem 144. These subsystems maintain certain databases of information that enable the system to accurately control system access, subscription package definitions, and subscriber/consumer profile and billing.

The information server 108 is coupled to the video session manager 122 via data path 116, synchronization clock path 118, and control path 120. The server 108 provides data streams that are destined for consumers on path 116 and a synchronization clock on path 118. The specific data streams are provided in response to requests for information (e.g., menu applets, video programs, and other content material) from the video session manager 122 on path 120. These data streams are packetized and modulated onto a carrier that is compatible with the transmission requirements of the network 104.

The video session manager 122 accomplishes all of the transmission interface requirements of the system 100 as well as provides graphical user interface support. Specifically, the video session manager 122 is coupled through the modems 127 to subscriber equipment via a forward information channel 132, a forward command channel 133 and a back channel 134. All three of these channels are supported by the cable transport subsystem 104. The video session manager 122 contains a modulator for modulating the server data streams onto one or more carrier frequencies for transmission on the forward information channel 132. Additionally, modems 127 within the video session manager 122 send control information via the forward command channel and receive control information via the back channel. Moreover, a conventional cable television signal source 128 is optionally coupled to the forward information channel via a signal coupler 130. In operation, the video session manager 122 responds to requests from the subscriber equipment 106 for interactive menus and data streams by requesting the server 108 to provide such information, then communicating that information to the requesting subscriber equipment 106. The video session manager 122, as discussed below, also ensures that the subscriber equipment 106 is authorized to receive the requested information.

The cable transport subsystem 104 can be any one of a number of conventional broad band communications networks that are available such as a fiber optic network, a telephone network, existing cable television network and the like. For example, if the network is a hybrid fiber-coax network, the transport technique used in both forward channels may be modeled after the moving pictures expert group (MPEG) transport protocol for the transmission of video data streams. In general, the transport mechanism for both the forward channels and transport information to the subscriber equipment must be able to carry unidirectional, asynchronous packetized data such as that defined in the MPEG video and audio signal transmission protocol, and the like. There are a number of such transport protocols available.

The subscriber equipment 106 receives the requested data streams as well as broadcast streams from the forward information channel, demodulates the streams and processes them for display on the display device 140 (e.g., a conventional television). In addition, the terminal 136 accepts commands from a remote control input device 138 or other input device to facilitate consumer interaction with the system. These commands are formatted, compressed, modulated, and transmitted through the network 104 to the video session manager 122. Typically, this transmission is accomplished through the back channel 134. These commands are preferably transmitted through the same network used to transmit information to the subscriber equipment. However, the back channel coupling the subscriber equipment to the server may be a separate network, e.g., a forward information channel through a television cable network and a back channel through a telephone network. The telephone network could also support the forward control channel. The video session manager 122 interprets each command set from the terminal through the back channel and instructs the information server to perform certain functions to implement the consumer/subscriber request.

Figure 2:
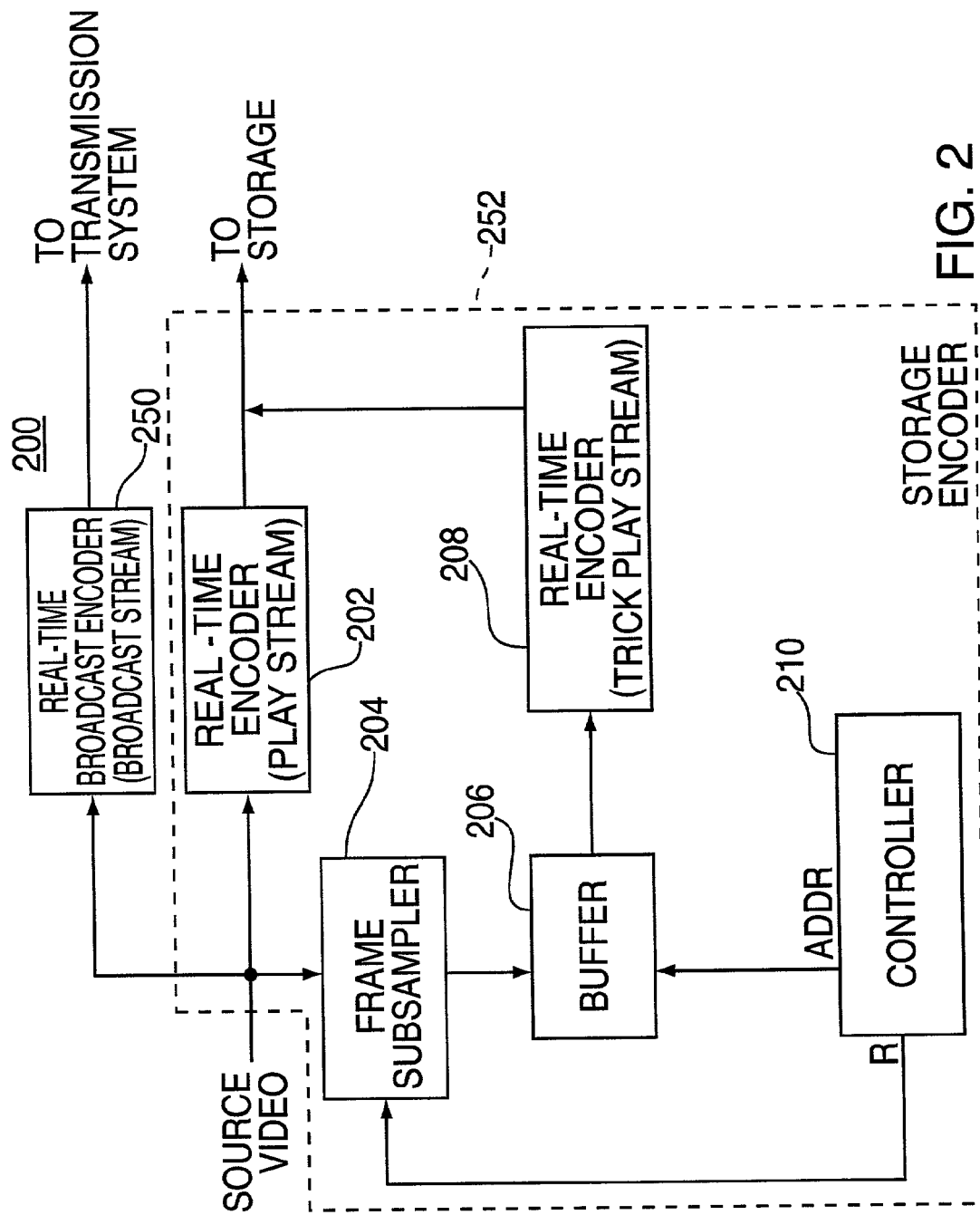
FIG. 2 depicts a block diagram of the encoder of the present invention.

FIG. 2 depicts a block diagram of the encoder 200 comprising a broadcast encoder 250 and a storage encoder 252. The broadcast encoder 250 encodes a source video sequence in a conventional manner, i.e., compressing the source video sequence In real-time as the frames are input to the encoder. For example, this encoder may be a high speed encoder such as an 8 Mbps MPEG-2 encoder that accurately encodes such difficult to compress programming such as sporting events.

The storage encoder 252 comprises a first encoder 202, frame subsampler 204, a frame buffer 206, a second encoder 208 and a controller 210. The first encoder 202 encodes a source video sequence in a conventional manner, i.e., compressing the source video sequence in real-time as the frames are input to the encoder 202. The second encoder 208 operating in conjunction with the subsampler 204 and the buffer 206, encodes a subsampled version of the source video sequence to form a fast forward and fast reverse bitstreams (collectively referred to herein as trick play bitstreams or trick play streams). The first encoder (the play stream encoder 202) contains a real-time MPEG-2 encoder that produces an MPEG-2 compliant, compressed video bitstream (a play stream) from a sequence of 601-format video frames. The second encoder (the trick play stream encoder 204) is also an MPEG-2 real-time encoder 212.

For the following discussion, frame numbering is used to describe the temporal order in which frames occur in source material where 1 is the first frame in the source material frame sequence and 2 is the second frame and so on. For the following description, R is an integer and defines a playback speed multiplier which has significance in the trick play processes. The speed multiplier R is a variable that is established by the controller 210. Throughout this disclosure, the exemplary trick play streams are fast forward and fast reverse. Of course other forms of trick play streams may be generated using the encoder 200 of the present invention. If the multiplier R equals 2, playback (decoding) of a fast forward stream is twice normal single speed. If R equals 3, playback is three times normal play speed and so on. Generally, the trick play streams include a nine times fast forward stream and a nine times fast reverse stream. Alternatively, 32 times normal fast forward and fast reverse streams are also available. The term source is used to describe the uncompressed video material (601-format video) from which fast forward and fast reverse bitstreams are generated.

Using the encoder 200, a fast forward MPEG video bitstream is generated from an uncompressed video source such that when the stream is played back linearly through a standard MPEG compliant video decoder, the resulting imagery contains every Rth frame of the original video sequence. As such, the display of the sequence has a fast forward effect.

A fast reverse stream is simultaneously produced by the storage encoder 252 such that when linearly played back through a an MPEG compliant video decoder, the decoded stream produces a sequence of frames that play in reverse relative to the original frame sequence.

The play bitstream is formed using a conventional MPEG-compliant encoder 202 that compresses a plurality of frames (N frames that form a group-of-pictures (GOP)). To form the trick play streams having N frame GOPS, the subsampler 204 extracts one out of every R consecutive frames (arranged in increasing time code order) from the source sequence. The selected N frames are buffered in the frame buffer 206. For example, if R is two and the buffer stores N frames, the buffer stores frames 1, 3, 5, 7, 9, and so on up to frame 2N+1. The buffer 206 stores N successive frames that define a GOP for the trick play bitstreams.

To produce a fast forward stream, the N frames from the buffer 206 are recalled under the control of the controller 210 and coupled sequentially into the real-time encoder 208. The output is a compressed bitstream representing a fast forward GOP.

To produce a fast reverse stream, the N frames from the buffer 206 are recalled under the control of the controller 210 and are coupled in reverse time order into the encoder 208. Although two encoders could be used to produce each of the trick play streams independently, as long as R equals two or more, a single encoder can be used to produce both trick play tracks using time multiplexing technique. To perform the multiplexed encoding, the fast forward GOP is encoded first, then the fast reverse GOP. After the buffer is filled with another N frames, the GOP pair is again encoded and so on. The recall order of the frames from the buffer and the multiplexing process are controlled by controller 110 by addressing the buffer in forward order for the fast forward GOP and in reverse order for the fast reverse GOP.

The forward and reverse GOPs contain sequence start and sequence end codes such that, when stored in a mass storage device along with the standard play stream, the bitstreams are clearly delimited.

The forward and reverse GOP bitstreams are stored with the play stream in a storage medium such as a disk drive array or magneto-optical disk. The fast forward stream is written sequentially, one GOP bitstream at a time, from the lowest address to the highest address. The reverse bitstream is stored in reverse order from highest address to lowest address. The last byte in the reverse GOP is placed in the highest address space of the reverse target file. As such, the reverse GOP precedes, in address space, the first frame of the immediately previously written reverse GOP.

The entire source material frame sequence is encoded in this manner to simultaneously produce a play, a fast forward, and fast reverse streams in real-time.

Figure 3:
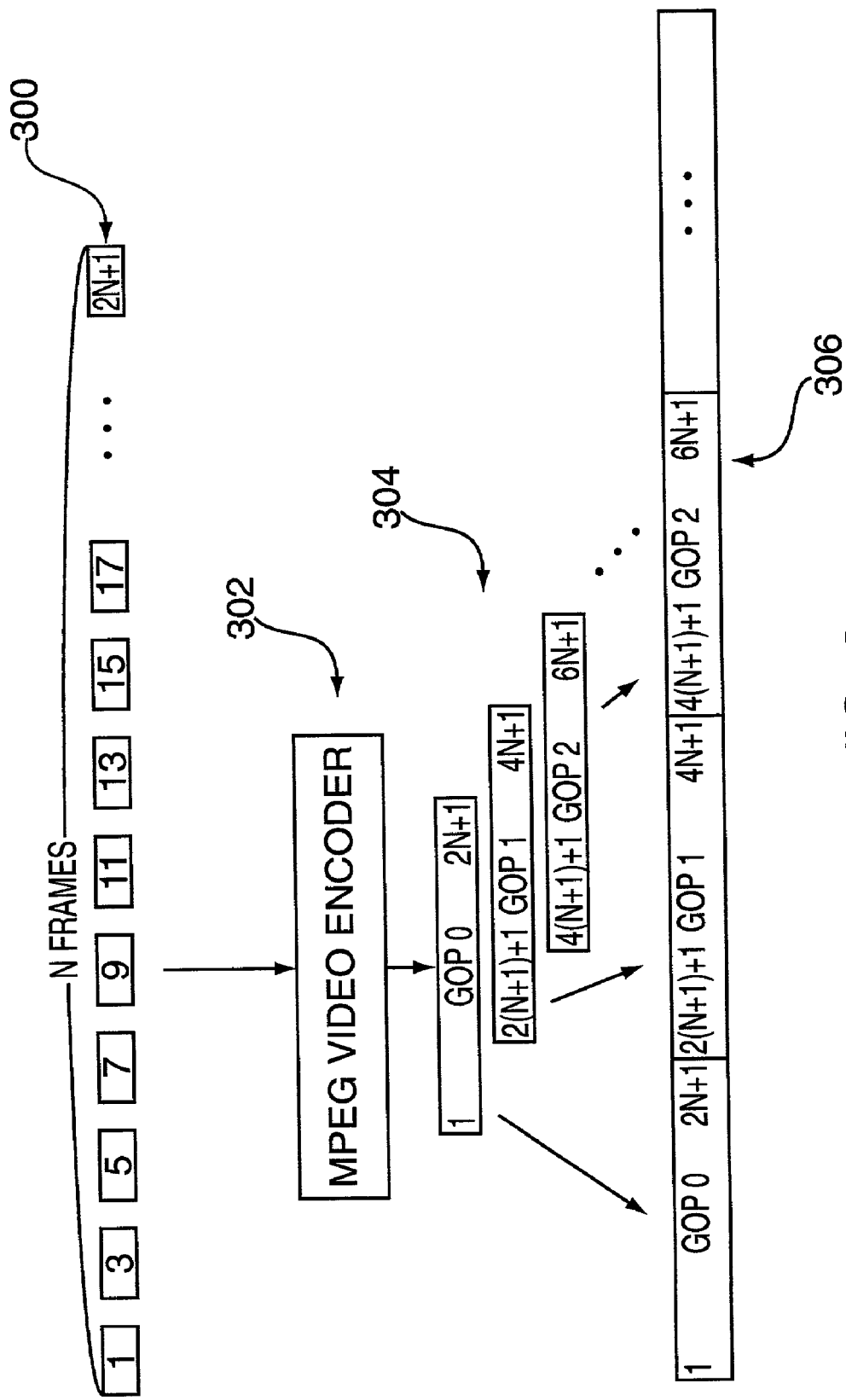
FIG. 3 illustrates the method of the present invention used to produce a fast forward bitstream.

FIG. 3 illustrates the process by which a fast forward stream is produced. Sequence 300 represents the RN frames that have been subsampled from a video frame sequence at a one of R rate from a video frame sequence and stored in the buffer (e.g., R=2, then 2N frames are subsampled to form a trick play GOP). The integer N is the number of frames that are encoded into each GOP of the standard play stream. These buffered frames are recalled from memory, encoded and then associated with a normal play stream having a GOP of N frames. The encoder (at step 302) repetitively produces a sequence of GOPs 304 that are stored in increasing addresses in memory as illustrated in sequence 306. The first GOP (GOP 0) contains frames 1 to RN+1, the second GOP (GOP 1) contains frames R(N+1)+1 through 2RN+1, the third GOP (GOP 2) contains frames 2R(N+1)+1 through 3RN+1, and so on. To generalize, a GOP contains frames GR(N+1)+1 through (G+1)RN+1, where G is the GOP number (e.g., 0, 1, 2, 3, . . . ), R is the subsampling rate, and N is the number of frames in a standard play GOP.

Figure 4:
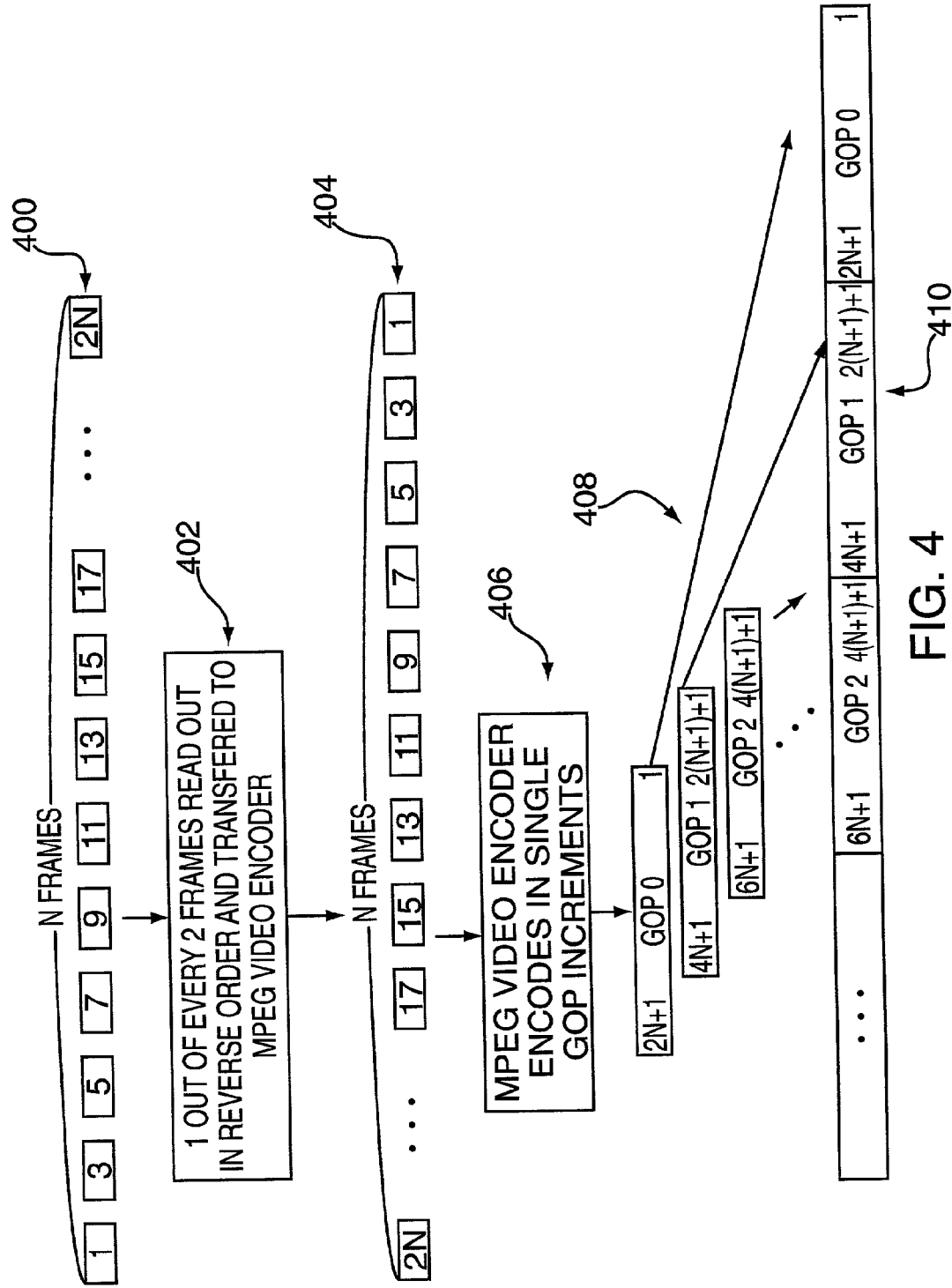
FIG. 4 illustrates the method of the present invention used to produce a fast reverse bitstream.

FIG. 4 illustrates the process by which a fast reverse stream is produced. Sequence 400 represents the RN frames that have been buffered after subsampling at one of R rate (e.g., R=2 in FIG. 4). At step 402, these frames are selected from the buffer in reverse order as illustrated at 404. The reverse order frames are encoded, at step 406, to produce a sequence of GOPs 408 that are stored in reverse time order in memory as illustrated in sequence 410.

Returning to FIG. 2, the real-time broadcast encoder 250 is, for example, a high data rate encoder (e.g., producing an 8 Mbps data rate MPEG bitstream) from a real-time television broadcast. The source video is, for example, a television feed of a sporting event. The source video either arrives at the encoder in a frame-based digital video format, such as 601 video, or is converted from some other format into a frame-based video format prior to the encoder. The real-time broadcast encoder operates simultaneously with the storage encoder such that the real-time broadcast bitstream is coupled to the transmission system as the storage bitstreams are being stored in the information server's data storage.

Figure 5:
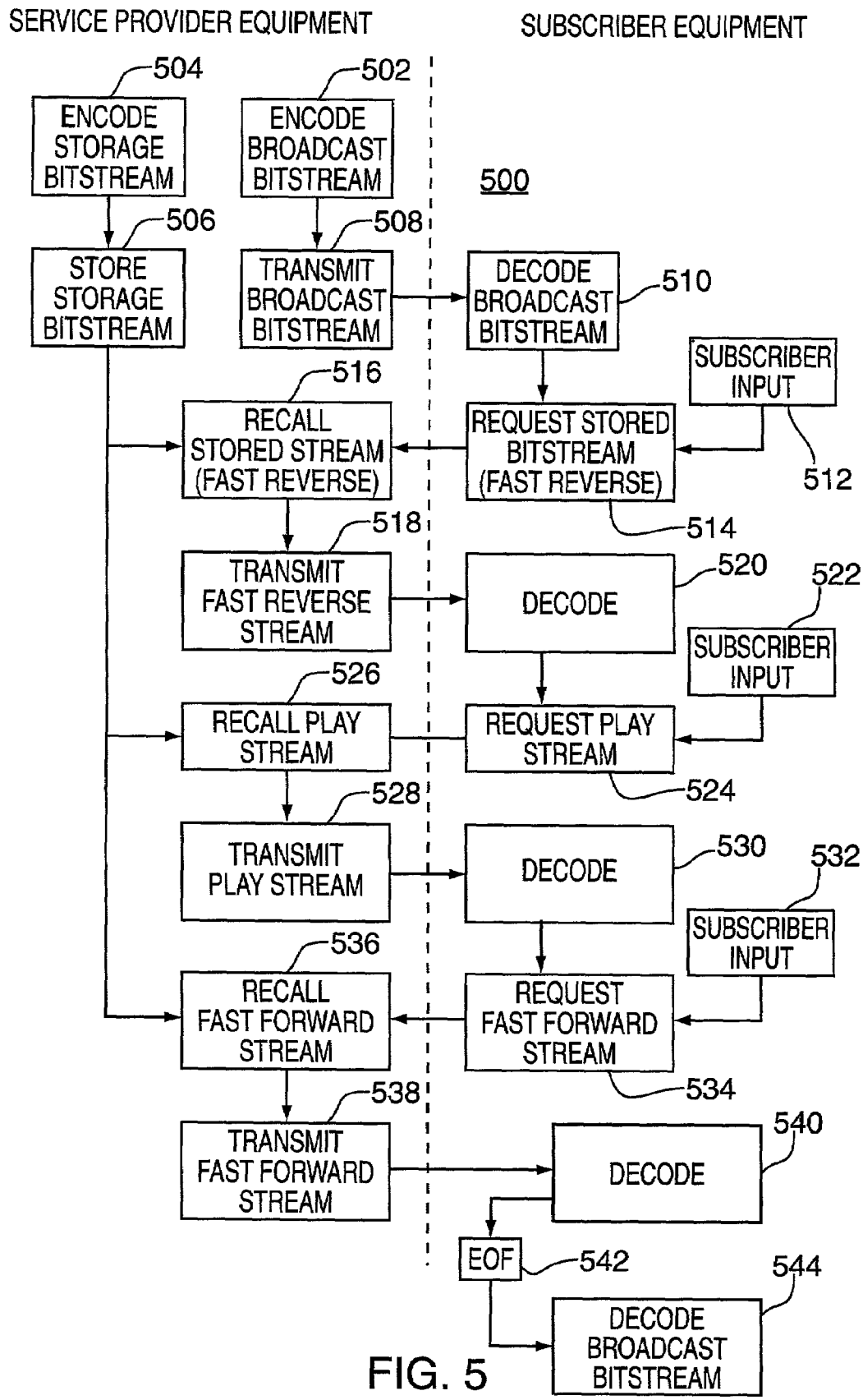
FIG. 5 illustrates the interaction model between the service provider equipment and subscriber equipment.

Returning to FIG. 1 and simultaneously referring to the flow diagram 500 of FIG. 5, The source video is encoded as a broadcast stream in step 502 and as a storage stream in step 504. As described above, the storage bitstream is stored in the information server memory at step 506, while the broadcast bitstream is transmitted to the subscribers at step 508. To facilitate broadcast of the broadcast bitstream, the broadcast bitstream is coupled into path 116 to the video session manager 122. The video session manager 122 multiplexes the broadcast bitstream into a transport stream along with all the other multimedia signals, control signals and the like that are transmitted through the cable transport subsystem 104 to the subscriber equipment 106. At step 510, the subscriber terminal 136 demodulates, demultiplexes and decodes the broadcast bitstream for real-time display.

To facilitate VCR-like functions with respect to the broadcast bitstream, the subscriber terminal 136 can request the stored bitstreams corresponding to the broadcast bitstream by manipulating the input device 138 (step 512) in the same manner as the device is used to control the display of any other video asset. The subscriber, at any time, may elect to review a portion of the program that has already been watched. As such, the subscriber manipulates the input device 138 (step 512) such that, at step 514, a "rewind" or fast reverse command is sent from the subscriber terminal 136 to a modem 127 requesting rewind. The session control manager 125 then instructs, at step 516, the information server 108 to recall the fast reverse stream associated with the broadcast bitstream and send, at step 518, the fast reverse stream to the requesting subscriber, i.e., the transmission to the subscriber is now changed from a broadcast transmission to a pointcast transmission. At step 520, the subscriber terminal demodulates, demultiplexes and decodes the transport stream carrying the reverse play stream such that the display 140 depicts the broadcast video running quickly backwards at some rewind rate, e.g., nine times standard play.

At some point during the "rewinding" of the video sequence, the subscriber may, at step 522, elect to "play" the video sequence. By selecting the "play" button on the input device, the subscriber terminal sends, at step 524, a request to the session control manager 125. The session control manager 125 then requests, at step 526, the standard play stream to be sent, at step 528, to the subscriber starting at the location at which the video sequence had been "rewound", i.e., whatever frame number the subscriber was viewing at the time the play button was depressed, will be the starting frame number that is sent to the subscriber in the play stream. At step 530, the play stream is then demodulated, demultiplexed, and decoded such that the display in the subscriber's home transitions from rewind to play. The subscriber may then watch the program from this point forward or may request another trick play function.

For example, at step 532, the subscriber selects a fast forward function to move through the video quickly, e.g., nine times standard play speed. If the subscriber elects to fast forward through the video, the subscriber terminal once again sends, at step 534, a request to the session control manager 125 which, in turn, requests, at step 536, the information server to recall the fast forward stream starting at the frame (or near the frame) that the user was then watching in the play stream. The session control manager 125 sends, at step 538, the fast forward stream to the subscriber. At step 540, the fast forward stream is then demodulated, demultiplexed and decoded to present a fast forward display. This stream will be transmitted until there is no longer any fast forward data, i.e., the storage bitstream catches up with the broadcast stream and an end of file (EOF) indicator is reached. At that occurrence, the subscriber terminal, at step 542, automatically switches the subscriber back to the broadcast stream. At step 544, the subscriber terminal 136, demodulates, demultiplexes and decodes the broadcast stream.

An alternative to requiring the subscriber to fast forward to catch up to the broadcast stream is to provide a "catch up" button that, when depressed, causes the subscriber terminal to instantly transition from decoding the storage bitstream to decoding the broadcast bitstream. This button may be a hardware button on the input device or a software button that is displayed on the television display.

Although various embodiments which incorporate the teachings of the present invention have been shown and described in detail herein, those skilled in the art can readily devise many other varied embodiments that still incorporate these teachings.

What is claimed is:

1. Apparatus for providing demand television comprising:
  a broadcast encoder for receiving and encoding a real-time video frame sequence to form a broadcast bitstream; and
  a storage encoder for receiving and encoding the real-time video frame sequence to form a plurality of storage bitstreams, wherein said storage encoder comprises:
    a first encoder for producing a play bitstream that contains information that, when decoded, produces a forward play video frame sequence, said first encoder receiving and encoding the real-time video frame sequence contemporaneously with said broadcast encoder receiving and encoding said real-time video frame sequence;
    a frame subsampler for receiving and subsampling the real-time video frame sequence contemporaneously with said broadcast encoder and first encoder receiving and encoding said real-time video frame sequence;
    a buffer, for storing subsampled frames of the real-time video frame sequence;
    a second encoder for producing, contemporaneously with said broadcast encoder receivng and encoding said real-time video frame sequence, both (i) a fast forward bitstream that contains information that, when decoded, produces a fast-forward video frame sequence, and (ii) a fast-reverse bitstream that contains information that, when decoded produces a fast-reverse video frame sequence; and a controller that selects subsampled frames from the buffer and couples selected frames to the second encoder in such a manner that said producing of said fast forward bitstream and said fast reverse bitstream is muitiplexed over time.

2. The apparatus of claim 1 wherein said broadcast encoder is a high data rate encoder.

3. The apparatus of claim 1 wherein said first encoder is an MPEG encoder that encodes N frames of the video sequence.

4. The apparatus of claim 3 wherein said second and third encoders are MPEG encoders that encodes N subsampled frames.

5. The apparatus of claim 1 wherein the controller multiplexes selection of the frames from the buffer to apply a plurality of subsampled frames to said second encoder to form said fast forward bitstream and then apply a plurality of subsampled frames to said third encoder to form said fast reverse bitstream.

6. The apparatus of claim 1, further comprising:
a transmission system for transmitting the broadcast bitstream to subscriber equipment.

7. The apparatus of claim 6, further comprising:
a storage device for storing the plurality of storage bitstreams, wherein the storage device stores the plurality of storage bitstreams contemporaneously to the transmission system transmitting the broadcast bitstream.

8. The apparatus of claim 6, wherein said fast forward bitstream contains an indicator that delimits an end of available data such that a transition from said fast forward bitstream to at least one of said broadcast bitstream and said play bitstream is appropriate.

9. The apparatus of claim 1, wherein the controller couples a plurality of video frames, which form a group of pictures (GOP), to the second encoder to form the fast forward bitstream, and then couples the same plurality of frames, having the frames organized in reverse order, to the second encoder to form the fast reverse bitstream.

10. A method for providing demand television comprising the steps of:
encoding in real-time, using a broadcast encoder, a broadcast video frame sequence to form a broadcast bitstream, while contemporaneously encoding the broadcast video frame sequence to form a plurality of storage bitstreams, wherein said plurality of storage bitstreams are contemporaneously formed by the steps of:
encoding, using a first storage encoder, said frames to form a play bitstream contemporaneously with said encoding, in real-time, said broadcast video frame sequence to form said broadcast bitstream;
subsampling said broadcast video frames contemporaneously with respect to said encoding said frames to form said broadcast bitstream and said play bitstream;
buffering said subsampled frames;
generating a fast forward bitstream and a fast reverse bitstream in a time multiplexed manner, said generating comprising:

recalling said buffered frames in a forward time sequence order;
encoding, using a second storage encoder, said recalled buffered frames to form a fast forward bitstream;
recalling said buffered frames in a reverse time sequence order; and
encoding, using said second storage encoder, said recalled buffered frames to form a fast reverse bitstream.

11. The method of claim 10 wherein said broadcast bitstream is a high data rate bitstream.

12. The method of claim 10 wherein said play bitstream when decoded forms a standard play frame sequence.

13. The method of claim 10 wherein said fast forward bitstream, when decoded, forms a fast forward frame sequence.

14. The method of claim 10 wherein said fast reverse bitstream, when decoded, forms a fast reverse frame sequence.

15. The method of claim 10 wherein said transmitting step further comprises the steps of:
recalling from said storage device a particular bitstream in response to a request for a particular bitstream type from a subscriber terminal;
addressing the requested bitstream to said requesting subscriber;
transmitting said requested bitstream to said subscriber equipment.

16. The method of claim 10, further comprising:
broadcasting the broadcast bitstream to subscriber equipment while contemporaneously storing the plurality of storage bitstreams within a storage device.

17. The method of claim 10, wherein upon a subscriber selecting to view information previously broadcast by the broadcast bitstream, transmitting to the subscriber the storage bitstream.

18. The method of claim 10, wherein said fast forward bitstream contains an indicator that delimits the end of available data such that a transition from said fast forward bitstream to at least one of said broadcast bitstream and said play bitstream is appropriate.

19. The method of claim 18, wherein said storage bitstream comprises at least a play bitstream and a fast forward bitstream, and upon said fast forward bitstream being exhausted of data, automatically switching from said storage bitstream to said broadcast bitstream.

20. The method of claim 10, comprising coupling a plurality of video frames, which form a group of pictures (GOP), to the second encoder to form the fast forward bitstream, and then coupling the same plurality of frames, having the frames organized in reverse order, to the second encoder to form the fast reverse bitstream.

21. The method of claim 10 wherein the method further comprises a step of switching from transmitting a fast forward bitstream to transmitting said broadcast bitstream upon reaching the indicator.

* * * * *

UNITED STATES PATENT AND TRADEMARK OFFICE
CERTIFICATE OF CORRECTION

PATENT NO. : 7,024,678 B2  Page 1 of 1
APPLICATION NO. : 09/201530
DATED : April 4, 2006
INVENTOR(S) : Donald F. Gordon et al.

It is certified that error appears in the above-identified patent and that said Letters Patent is hereby corrected as shown below:

<u>Column 5,</u>
Line 15, change "In" to -- in --.
Line 30, change "bitatreams" to -- bitstreams --.

<u>Column 6,</u>
Line 6, change "GOPS" to -- GOPs --.

<u>Column 8,</u>
Line 64, change "receivng" to -- receiving --.

<u>Column 9,</u>
Line 8, change "muitiplexed" to -- multiplexed --.
Line 59, after the semi-colon ";" insert -- and --.

<u>Column 10,</u>
Line 32, after "ment" insert a comma -- , --.
Line 55, change "fast" to -- first --.

Signed and Sealed this

Twenty-seventh Day of June, 2006

JON W. DUDAS
*Director of the United States Patent and Trademark Office*